Patented Aug. 19, 1947

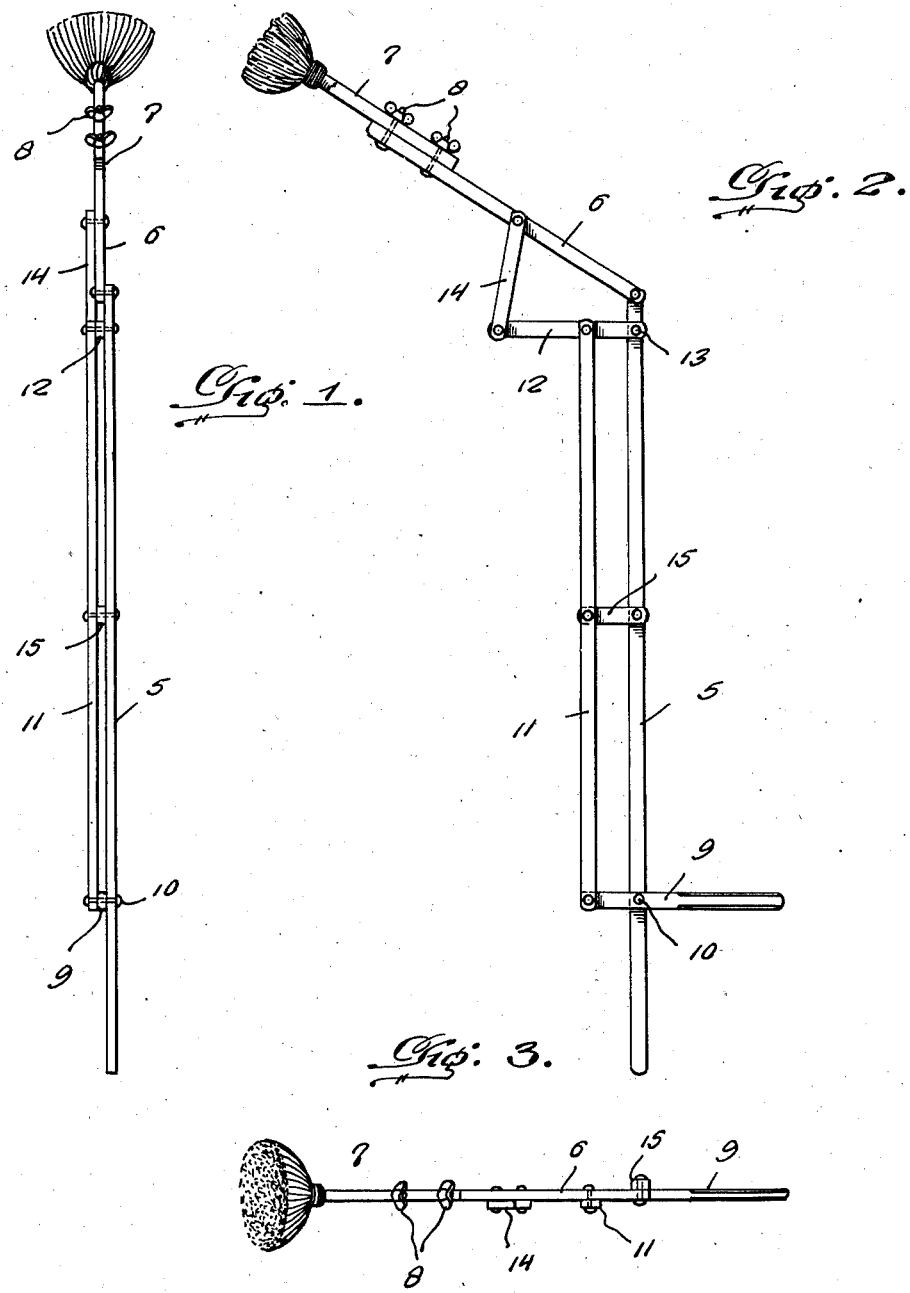

2,425,852

UNITED STATES PATENT OFFICE 2,425,852

CEILING AND WALL CLEANING BRUSH

John A. Young, Beaumont, Tex.

Application November 8, 1944, Serial No. 562,471

2 Claims. (Cl. 15—49)

The present invention relates to brushes designed primarily for use in cleaning ceilings and high walls, and the invention has for its primary object to provide a long handle having a pivoted extension at its outer end and to which the brush is attached together with means connected to the extension for pivotally actuating the same in a manner to swing the brush back and forth across the surface being cleaned.

A further object is to provide a device of this character of simple and practical construction, which is strong and durable, efficient and reliable in use and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing one side of the brush and handle therefor.

Figure 2 is a side elevational view of another side of the brush, and

Figure 3 is a top plan view.

Referring now to the drawings in detail wherein for the purpose of illustration I have disclosed a preferred embodiment of the invention, the numeral 5 designates an elongated pole having a handle provided with an extension 6 pivotally attached thereto at its inner end and to the outer end of which is attached a handle or shank 7 by means of the bolts and wing nuts 8, the handle or shank 7 extending longitudinally outwardly of the outer end of the extension 6 and forming a support for a cleaning implement.

The extension 6 is manipulated by means of a lever 9 of the first class pivoted as at 10 adjacent one end of the pole handle.

To the short arm of the lever 9 is pivotally attached one end of a rod 11, the rod extending substantially parallel to the pole 5 and is pivotally attached at its other end adjacent one end of a lever 12, the short arm of the lever 12 being pivoted as at 13 adjacent the outer end of the pole 5 and inwardly of the pivoted connection of the extension 6.

To the outer or longer arm of the lever 12 is pivotally attached one end of a link 14 which has its other end pivoted to an intermediate portion of the extension 6.

A brace link 15 is pivotally connected at each end to an intermediate portion of the pole 5 and rod 11. The brush handle or shank 7 is detachably connected to the outer end of the extension 6 so that other types of cleaning implements may be substituted therefor, such as a whiskbroom or the like and after the brush or other cleaning implement is attached to the extension 6 the same is manipulated for brushing a ceiling or walls of a room, as well as light fixtures and other difficultly accessible places by raising and lowering the handle of lever 9 which produces a reciprocating motion of the rod 11 and through its connection with the extension 6 by means of the lever 12 and link 14 will cause an oscillating movement of the extension 6 and the implement supported thereon.

By pivotally connecting the upper end of the rod 11 adjacent the inner end of the lever 12 the throw of the lever and extension 6 is increased so that a relatively wide sweeping or swinging movement of the brush is accomplished by a slight movement of the lever 9.

Because of the length and slenderness of both the rod 11 and the pole 5 it became necessary to brace and reinforce them. In order to accomplish this desired result the brace link 15 was used successfully to prevent undue bowing and flexing of the pole and rod.

It is believed that the details of construction, operation and advantages of the device will be readily understood from the foregoing without further detailed explanation.

Having thus described the invention, what I claim is:

1. A cleaning device of the class described comprising a pole, an extension pivotally attached at one end to one end of the pole, the other end of the pole constituting a handle, a cleaning implement including a support therefor detachably secured to the outer end of the extension, a lever having a handle pivotally attached to the pole adjacent the handle end thereof, said last-named lever having relatively long and short arms, a rod pivotally attached at one end to the short arm of said last-named lever, said rod extending parallel to the pole, said pole and rod being movably connected intermediate their ends by a brace link, a lever pivotally attached at one end to the pole adjacent the extension, said rod being pivotally attached to the lever adjacent its pivoted end and a link pivotally connecting the other end of the lever to the extension and adapted to transmit movement of the second-named lever to the extension.

2. A cleaning device of the class described comprising a pole having a handle on one end thereof, an extension pivotally attached at one end to the other end of the pole, means for detachably securing a cleaning implement to the outer end of the extension in a longitudinally extending position with respect to the extension, a rod movably connected to the pole to maintain itself in substantially parallel relation to the pole, a lever of the first class pivoted intermediate its ends to the pole adjacent the handle end of the latter, a lever of the third class pivoted at one end adjacent the other end of the pole, said levers having relatively short and long arms and a link pivotally connecting the long arm of the third class lever to the extension, the movement of the long arm of said first class lever resulting in an increased speed and distance of movement to the extension, said first class lever having a handle on its free end.

JOHN A. YOUNG.

REFERENCES CITED

The following references are of record in the file of this patent:

UNITED STATES PATENTS

| Number | Name | Date |
|---|---|---|
| 825,379 | Clark | July 10, 1906 |
| 2,168,121 | French | Aug. 1, 1939 |

FOREIGN PATENTS

| Number | Country | Date |
|---|---|---|
| 73,000 | Germany | Jan. 12, 1894 |
| 29,000 | Germany | Aug. 28, 1884 |